US012016825B2

(12) United States Patent
Mina et al.

(10) Patent No.: US 12,016,825 B2
(45) Date of Patent: Jun. 25, 2024

(54) ELASTOMERIC ENTERAL FEEDING PUMP AND FILLING SYSTEM

(71) Applicant: Avent, Inc., Alpharetta, GA (US)

(72) Inventors: Thomas D. Mina, Newport Beach, CA (US); Shane A. Duffy, Irvine, CA (US); Donald J. McMichael, Roswell, GA (US); Hilton M. Kaplan, New York, NY (US)

(73) Assignee: Avent, Inc., Alpharetta, GA (US)

(*) Notice: Subject to any disclaimer, the term of this patent is extended or adjusted under 35 U.S.C. 154(b) by 155 days.

(21) Appl. No.: 17/389,624

(22) Filed: Jul. 30, 2021

(65) Prior Publication Data

US 2023/0036837 A1 Feb. 2, 2023

(51) Int. Cl.
*A61J 15/00* (2006.01)

(52) U.S. Cl.
CPC ....... *A61J 15/0076* (2015.05); *A61J 15/0011* (2013.01)

(58) Field of Classification Search
CPC .............. A61J 15/0076; A61J 15/0011; A61M 5/1424; A61M 5/1411; A61M 2209/045; A61M 11/008; A61M 3/0262
See application file for complete search history.

(56) References Cited

U.S. PATENT DOCUMENTS 228,422 A * 6/1880 Turner ................ A61M 5/1424 604/185
3,398,743 A * 8/1968 Shalit .................. A61M 3/0283 604/36
4,699,615 A * 10/1987 Fischell .............. A61M 5/1424 604/153
2002/0046751 A1* 4/2002 MacRae ............ A61M 15/0086 128/200.22
2003/0040709 A1* 2/2003 Mason ................ A61M 5/1454 604/141
2009/0171268 A1* 7/2009 Williams, Jr. ...... A61M 13/003 604/26
2016/0008536 A1* 1/2016 Gravesen ................ F16L 29/02 141/2
2021/0178030 A1 6/2021 Xiao

FOREIGN PATENT DOCUMENTS

CN 111 150 662 A 5/2020

OTHER PUBLICATIONS

International Search Report and Written Opinion for PCT/US2022/038672, dated Nov. 22, 2022, 10 pages.

* cited by examiner

*Primary Examiner* — Theodore J Stigell
(74) *Attorney, Agent, or Firm* — Dority & Manning, P.A.

(57) ABSTRACT

A non-electrically driven enteral feeding pump including an expandable elastomeric bladder is provided. The enteral feeding pump includes a fluid delivery tube. The fluid delivery tube controls flow rate of fluid from the pump. The present invention further describes an enteral feeding pump assembly including the portable enteral feeding pump and a peristaltic pump. The peristaltic pump can be configured to be operatively coupled to the elastomeric bladder of the enteral feeding pump for transferring fluid from a reservoir external to the elastomeric bladder into a chamber of the elastomeric bladder.

10 Claims, 9 Drawing Sheets

ELASTOMERIC ENTERAL FEEDING PUMP AND FILLING SYSTEM

FIELD OF THE INVENTION

The subject matter of the present invention relates generally to an elastomeric enteral feeding pump and assembly for filling an elastomeric enteral feeding pump.

BACKGROUND

There are many issues encountered by enteral feeding pump users today. Users complain of the many alarms, beeps, and other operating noises, as they can significantly impact quality of life, sleep, and ability for the patient to take part in daily activities without feeling stigmatized or isolated. Additionally, when ambulating with the pump, the patient is often required to have a large backpack in which the pump and all other supplies must be placed, making it difficult for tube feeders to be discreet about their condition when in public.

Additionally, manually filling a pump via a syringe or other transfer container is often difficult and time-consuming. The pressures required to activate the syringe can cause pain and/or injury to the person filling the pump due to these high pressures. Oftentimes, the total volume required in the pump means that multiple rounds of syringe actuation are required to finish the filling process, which can result in a time-consuming effort.

Consequently, there is a need for a discreet, e.g., non-electrically driven, enteral feeding pump that may be easily concealed. In particular, a discreet enteral feeding pump that does not require manual filling would also be useful.

SUMMARY

Objects and advantages of the invention will be set forth in part in the following description, or may be obvious from the description, or may be learned through practice of the invention.

The present invention is directed to a non-electrically driven enteral feeding pump. The pump includes: an expandable elastomeric bladder defining a chamber; an inlet port in fluid communication with the chamber, and an outlet port in fluid communication with the chamber; and a first fluid delivery tube. The first fluid delivery tube is configured to be in fluid communication with the chamber via the outlet port. The fluid delivery tube controls the flow rate of fluid delivered by the pump.

In one particular embodiment of the enteral feeding pump, the expandable elastomeric bladder can include an outer elastomeric bladder and an inner disposable liner.

In another embodiment, the expandable elastomeric bladder can include a body formed from a single layer of inert elastomeric material, wherein the chamber can be defined by an inner wall of the body of the expandable elastomeric bladder.

In a further embodiment, the fluid delivery tube can include a connector adapted to be coupled with an enteral feeding port.

In an additional embodiment, the pump can be configured to deliver fluid at a flow rate in a range from about 20 mL/hour to about 300 mL/hour.

In yet another embodiment, the fluid delivery tube can be integrally coupled with the bladder.

In a further embodiment, the enteral feeding pump can further include a set of alternate flow rate fluid delivery tubes, wherein the first fluid delivery tube and at least one alternate flow rate fluid delivery tube of the set can be configured to be interchangeably coupled with the bladder.

In still another embodiment, the enteral feeding pump can include a drip chamber, wherein the drip chamber can include at least one transparent window configured to enable a visual indication of flow through the fluid delivery tube.

In an additional embodiment, the bladder can include a generally spherical shape.

In one more embodiment, the bladder can include a wall having varying thickness.

The present invention is further directed to an enteral feeding pump assembly. The assembly includes a non-electrically driven enteral feeding pump comprising an expandable elastomeric bladder defining a chamber, the bladder comprising an inlet port and an outlet port; a first fluid delivery tube, wherein the first fluid delivery tube is configured to be in fluid communication with the chamber via the outlet port; and a peristaltic pump. The peristaltic pump is configured to be operatively coupled to the inlet port of the expandable bladder for transferring fluid from a reservoir external to the expandable bladder into the chamber of the expandable bladder.

In one embodiment of the enteral feeding pump assembly, the expandable elastomeric bladder can include an outer elastomeric bladder and an inner disposable liner.

In another embodiment, the expandable elastomeric bladder can include a body formed from a single layer of inert elastomeric material, wherein the chamber is defined by an inner wall of the body of the expandable elastomeric bladder.

In an additional embodiment, the fluid delivery tube can include a connector adapted to be coupled with an enteral feeding port.

In a further embodiment, the pump can be configured to deliver fluid at a flow rate in a range from about 20 mL/hour to about 300 mL/hour.

In yet another embodiment, the fluid delivery tube can be removably coupled with the bladder.

In still another embodiment, the assembly can further include a set of alternate flow rate fluid delivery tubes, wherein the first fluid delivery tube and at least one alternate flow rate fluid delivery tube of the set can be configured to be interchangeably coupled with the bladder.

In an additional embodiment, the assembly can further include a drip chamber, wherein the drip chamber comprises at least one transparent window configured to enable a visual indication of flow through the fluid delivery tube.

In yet another embodiment, the bladder can include a generally spherical shape.

In a further embodiment, the bladder can include a wall having varying thickness.

In one more embodiment, the assembly can further include a bolus delivery device.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
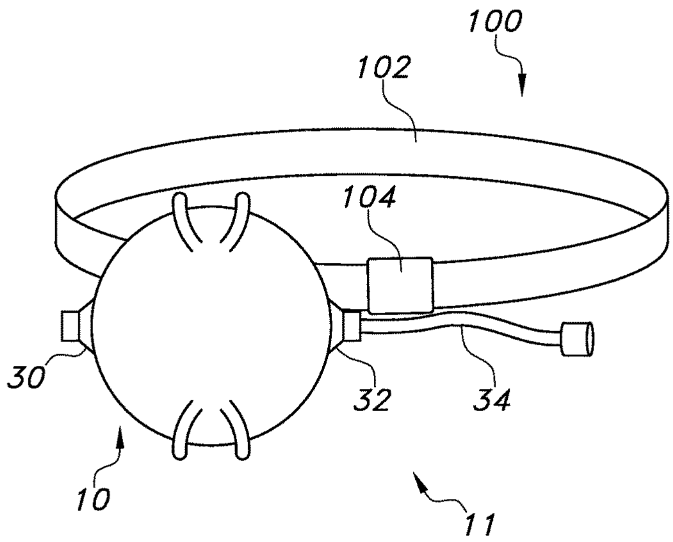
FIG. 1 illustrates a perspective view of a non-electrically powered enteral feeding pump including a support apparatus according to one particular embodiment of the present invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms “about,” “approximately,” or “generally,” when used to modify a value, indicates that the value can be raised or lowered by 5% and remain within the disclosed embodiment. Further, when a plurality of ranges are provided, any combination of a minimum value and a maximum value described in the plurality of ranges are contemplated by the present invention. For example, if ranges of “from about 20% to about 80%” and “from about 30% to about 70%” are described, a range of “from about 20% to about 70%” or a range of “from about 30% to about 80%” are also contemplated by the present invention.

Moreover, the particular naming of the components, capitalization of terms, the attributes, data structures, or any other programming or structural aspect is not mandatory or significant, and the mechanisms that implement the invention or its features may have different names, formats, or protocols. Also, the particular division of functionality between the various components described herein is merely exemplary and not mandatory; functions performed by a single component may instead be performed by multiple components, and functions performed by multiple components may instead performed by a single component.

Further, the detailed description uses numerical and letter designations to refer to features in the drawings. Like or similar designations in the drawings and description have been used to refer to like or similar parts of the invention. As used herein, the terms “first,” “second,” and “third” may be used interchangeably to distinguish one component from another and are not intended to signify location or importance of the individual components.

Generally speaking, the present invention is directed to an enteral feeding pump that is non-electrically driven. The pump includes an expandable elastomeric bladder defining a chamber, an inlet port in fluid communication with the chamber, and an outlet port in fluid communication with the chamber. The pump further includes a first fluid delivery tube. The first fluid delivery tube is configured to be in fluid communication with the chamber via the outlet port, and the fluid delivery tube controls the flow rate of fluid from the pump. The present invention is further directed to an enteral feeding pump assembly including the enteral feeding pump and a peristaltic pump, wherein the peristaltic pump can be used for filling the expandable elastomeric bladder of the enteral feeding pump. The present inventors have found that the enteral feeding pump assembly of the present invention can allow patients who require enteral nutrition delivery to easily conceal the enteral feeding pump, allowing them to take part in daily activities without feeling stigmatized or isolated. Moreover, by filling the enteral feeding pump using a peristaltic pump that a patient is likely to already have access to for day to day enteral feeding, the enteral feeding pump can be filled easily and quickly in a mechanical manner.

The specific features of the enteral feeding pump assembly of the present invention may be better understood with reference to FIGS. 1-11.

Referring now to FIG. 1, one embodiment of an elastomeric enteral feeding pump in accordance with the present subject matter is illustrated. An elastomeric pump 10 may be provided and will be described in further detail below. The elastomeric pump 10 can be coupled with a support apparatus 100. The support apparatus 100 can be provided to a user, e.g., patient, and can be configured to hold and/or support the elastomeric pump 10 for the user. For instance, in a non-limiting example, the support apparatus 100 may be a belt 102 having a fastener 104 as illustrated in FIG. 1. The belt 102 can be fastened around a user’s torso to secure the elastomeric pump 10 in place. In some aspects of the present invention, the support apparatus 100 may be configured to enable the elastomeric pump 10 to be discreetly positioned in relation to the user’s body, e.g., under a garment, around a waistline or torso, or otherwise concealed. In this manner, the present inventors have found that the elastomeric pump 10 of the present invention may enable enteral feeding pump users to be discreet about their condition when in public.

Figure 2:
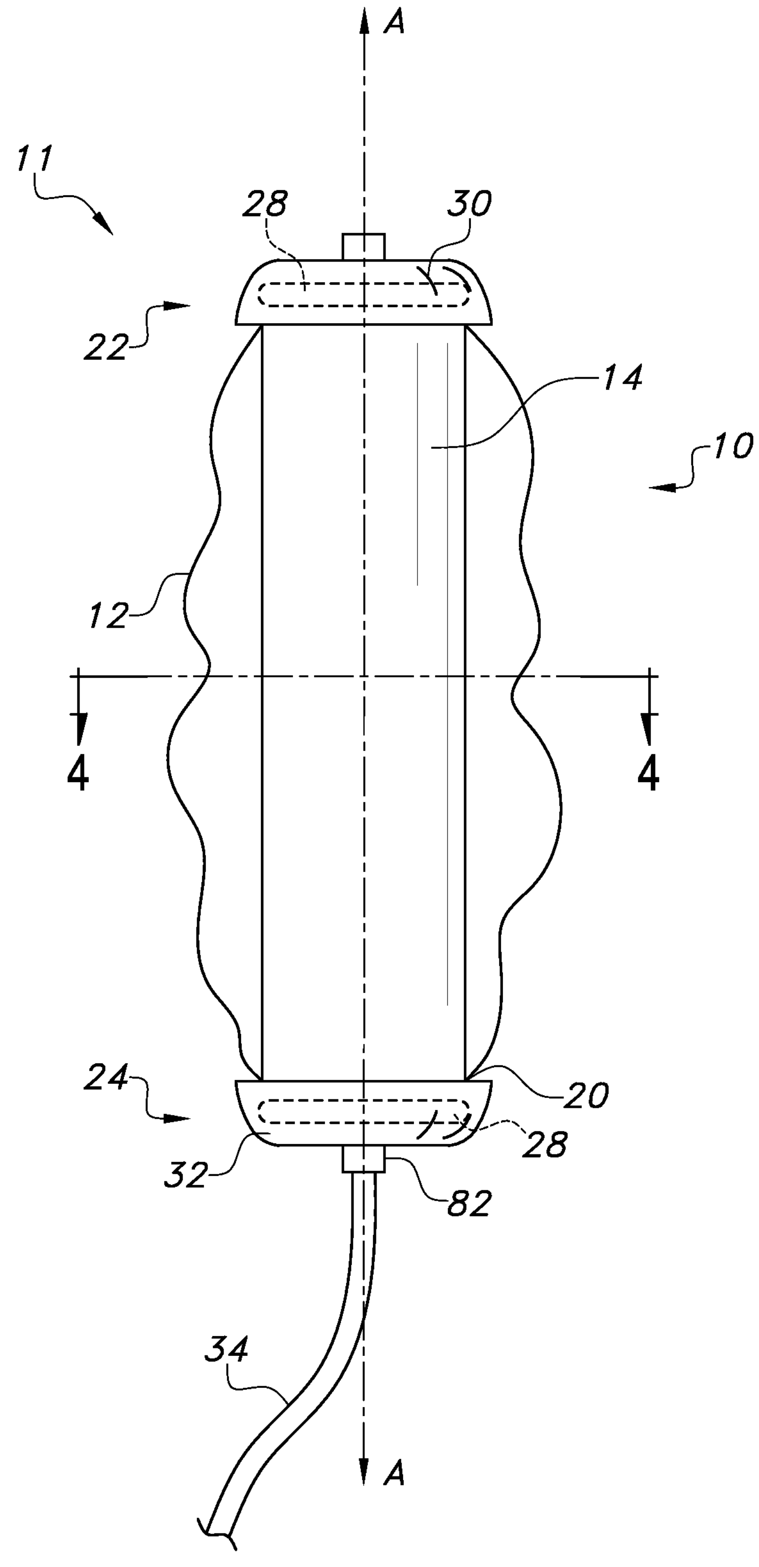
FIG. 2 illustrates a side view of the non-electrically powered feeding pump of FIG. 1.
Figure 3:
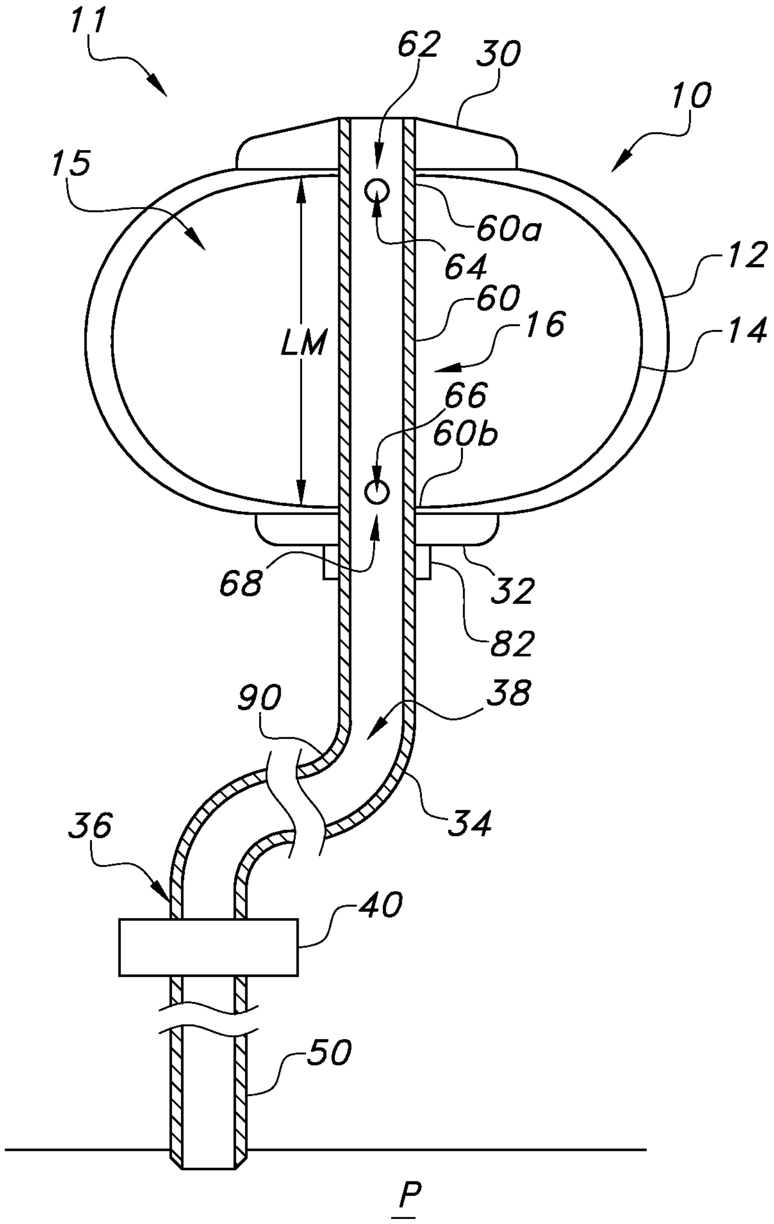
FIG. 3 illustrates a side cross-sectional view of the non-electrically powered feeding pump of FIG. 2.

FIGS. 2 and 3 illustrate an exemplary embodiment of an elastomeric pump for a portable enteral feeding assembly in accordance with the present subject matter. The elastomeric pump 10 of enteral feeding assembly 11 comprises an outer collapsible substantially non-stretchable housing or shell 12, protectively mounted over a bladder 14. More particularly, the collapsible housing 12 can have a substantially spherical configuration for confining and guiding an inflatable reservoir or bladder 14 into a concentric position around an optional central support member or mandrel 16 (see FIG. 3), enabling the bladder 14 to expand naturally in a generally spherical configuration as will be described. The collapsible housing 12 has coaxial openings defined by tubular sleeve extensions through which ends of the mandrel 16 extend. The collapsible housing 12 may be, e.g., a non-stretch blow molded housing of from five to ten mils in thickness and made of a material such as polyurethane, PVC film, and/or polyethylene that is transparent. This forms a simple, inexpensive, compact unit with a certain amount of protection for the elastic reservoir. Certain applications may require a tougher collapsible housing 12. In such cases, the housing 12 should be transparent, UV stable, flexible, and highly resistant to puncturing, e.g., the housing 12 may be constructed of a material such as tough composites in a flexible form such as a fabric such as the material available under the trademark Kevlar.

The bladder 14, which is an inflatable reservoir, may be mounted on the mandrel 16, e.g., using a press fit or a clearance fit. The bladder 14 can be formed from a body 70 formed from an elastomeric material. The bladder 14 can include an expandable internal chamber 15 which can be inflated or expanded by a fluid, e.g., by enteral nutritive liquid. The chamber 15 may be defined by an inner surface 74 of the bladder 14. The bladder 14 may be a single sleeve or multiple sleeves, e.g., the bladder 14 may comprise an inner sleeve that is a chemically inert sleeve and an outer sleeve or sleeves that are highly elastic. Notably, it is critically important for the inner surface 74 (see FIGS. 4 and 6) of the bladder 14 is formed from a food-safe, chemically inert material in order to maintain safety for delivering nutrition to a patient. In some aspects of the invention, the body 70 may be formed from a single layer of inert elastomeric material, e.g., silicone.

Figure 4:
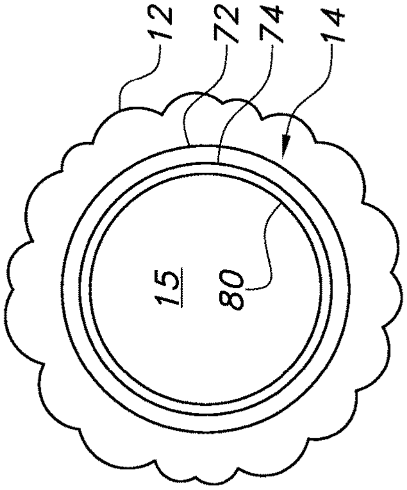
FIG. 4 illustrates a cross-sectional view of the non-electrically powered feeding pump of FIG. 2 taken along the line 4-4.

In some aspects of the present invention, as illustrated in FIG. 4, an inner sleeve of the bladder 14 may comprise a disposable inner liner 80 configured to line an inner surface 74 of an elastomeric body 70 of the bladder 14. The disposable inner liner 80 can be flexible to be removed from within the bladder 14. For instance, the disposable inner liner 80 can be formed from polyurethane. Polyurethane offers high elongation values (i.e., stretchability) like rubber, and abrasion resistance superior to that of PVC. A material having antimicrobial properties, such as polyurethane formulated to have antimicrobial properties, would also be ideal for forming the disposable inner liner 80. The disposable inner liner 80 can have a thickness as small as about 0.05 millimeters or about 0.002 inches. The disposable inner liner 80 can have a thickness up to a thickness that does not interfere with the inflation of the bladder 14, such as a thickness of about 0.75 millimeters or about 0.03 inches. For instance, the thickness of the disposable inner liner 80 can be in a range of from about 0.05 millimeters to about 0.75 millimeters, or from about 0.002 inches to about 0.030 inches. The thickness of the disposable inner liner 80 may be minimized in order to maximize the radius of the bladder 14 in order to reduce any potential increase in pressure within the bladder 14. Further, in some aspects of the invention, there may be a plurality of telescoping disposable inner sleeves 80 in successive layers within the bladder 14 such that the bladder 14 can be reused multiple times, and a disposable inner liner 80 removed for sterile enteral fluid delivery with each reuse.

The central support member or mandrel 16 may extend from a first end 22 to a second end 24 of the elastomeric pump 10 and can include circular grooves (not shown) at each end 22, 24 thereof into which portions of the bladder 14 and housing 12 can be biased, e.g., by means of a pair of O-rings 28. More particularly, an O-ring 28 can secure the bladder 14 to the mandrel 16 at each of the first and second ends 22, 24 of the mandrel 16. Each O-ring 28 fits into the groove at the respective end 22, 24 such that the bladder 14 may be secured between the O-ring 28 and the groove at each end 22, 24. Further, the first end 22 can include a first cap 30, e.g., a cup-shaped cap 30 as shown in FIGS. 1-2, and the second end 24 can include a second cap 32, e.g., a cup-shaped cap 32 as shown in FIGS. 2-3. The cup-shaped caps 30, 32 of FIGS. 2-3 can be low-profile caps, i.e., the cup-shaped caps 30, 32 may have a width in a radial direction of the bladder 14 that is greater than a height or protruding distance away from the bladder 14 in an axial direction such that the caps 30, 32 have minimal protrusion from the bladder 14. First and second caps 30, 32 can extend over and protectively cover the O-ring connections for clamping the bladder 14 and housing 12 to the mandrel 16. In exemplary embodiments, the caps 30, 32 may be releasably coupled to the ends 22, 24.

The mandrel 16 has a body 60 extending over a length LM between the first end 22 and the opposing second end 24. More particularly, the body 60 extends from a first body end 60*a* to a second body end 60*b*, where the body ends 60*a*, 60*b* are just axially inward from the O-ring grooves defined in mandrel 16. Further, the mandrel 16 has an inlet port 62 on one end 22, 24; the inlet port 62 is defined at the first end 22 in the illustrated embodiment. A fill port 64 is defined in the body 60 between the first end 22 and the second end 24; in the depicted embodiment, the fill port 64 is defined near the first end 22. In addition, a first bore (not shown) extends within the body 60 and is in fluid communication with the inlet port 62 and fill port 64. More particularly, the first bore extends coaxially with the central axis A of the elastomeric pump 10 from the first end 22 to the fill port 64, which extends transversely through the mandrel body 60. Fluid enters the elastomeric pump 10 through the mandrel inlet port 62 and flows through the fill port 64 into the chamber 15 formed by the bladder 14. To dispense the fluid from the reservoir, the fluid enters a dispense port 66 and flows through a second coaxial bore (not shown) to an outlet port 68 defined at or near the second end 24; the outlet port 68 is in fluid communication with a tube 34 which delivers the fluid to a patient, described in further detail below. It will be appreciated that one or more check valves may be included in the infusion pump assembly, e.g., to prevent fluid from flowing from the reservoir back through the inlet port 62 or from prematurely flowing from the reservoir to the tube 34 for delivery to the patient.

It will be appreciated that the bladder 14 expands and contracts to receive and dispense a fluid. Pressure acts on the fluid as it is injected into the bladder 14 to expand the bladder from an initial unexpanded state to a maximum expanded state. The maximum expanded state accommodates a fill volume. Typically, the fluid can be injected, e.g., by a manual or powered pump such as a peristaltic pump or a syringe-type device and passes through a one-way valve connector before it enters the bladder, and the pressures upstream of the one-way valve connector generally are greater than the pressures within the bladder. As such, the upstream pressures move the liquid through the valve connector, then through one end of the mandrel 16, through a port in the mandrel, and against an inner surface 74 (see FIG. 4) of the bladder 14. The crack pressure indicates the force that must be transmitted by the fluid to overcome the initial resistance to expansion of the inflatable bladder 14. The fill pressure indicates the forces required for gradual expansion of the bladder 14 between its ends 22, 24; the expansion is generally in a radial direction with respect to a central axis A of the pump 10. The fill pressures initially decrease from the maximum crack pressure and then increase to a maximum when the fill volume is achieved. Then, the pressure within the bladder 14 serves as the energy driver to push fluid from the bladder 14 and deliver nutrition to a patient P, as described further below.

Figure 6:
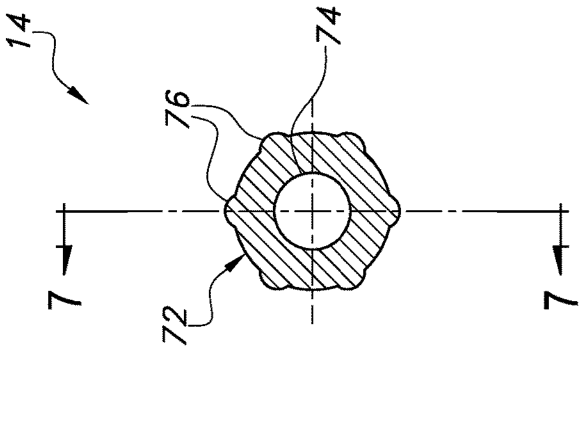
FIG. 6 illustrates a cross-sectional view of the bladder of FIG. 5 taken along the line 6-6.
Figure 5:
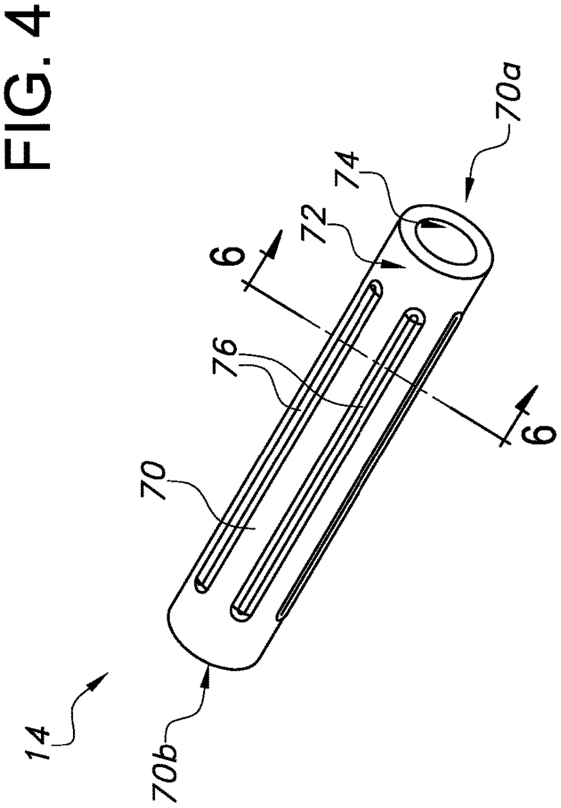
FIG. 5 illustrates a perspective view of an embodiment of a bladder of the non-electrically powered enteral feeding pump of FIG. 2 where the bladder has a wall of varying thicknesses.

FIGS. 5-6 provide a perspective view and an end view of a bladder 14 according to another exemplary embodiment of the present subject matter. As shown in the depicted embodiment, a plurality of ribs 76 may be defined along an outer surface 72 of the bladder 14. The ribs 76 may be evenly spaced apart from one another about a circumference of the bladder or may have any other suitable configuration. The ribs 76 may be formed from the material from which the bladder 14 is made such that the ribs 76 and bladder 14 are one integral component. Although FIGS. 5-6 illustrate ribs 76 extending along the longitudinal axis A of the bladder 14, the present invention contemplates ribs 76 extending in any direction, e.g., circumferential, axial, diagonal, curved, or any combination thereof, in order to achieve desired flow characteristics for filling and/or delivering the fluid into or out of the bladder 14. Moreover, the ribs 76 need not extend parallel to each other as shown in FIGS. 5-6. In other words, FIGS. 5-6 illustrate a non-limiting example of any desired shapes for ribs 76 or protrusions formed in the outer surface 72 of the bladder 14.

Figure 7:
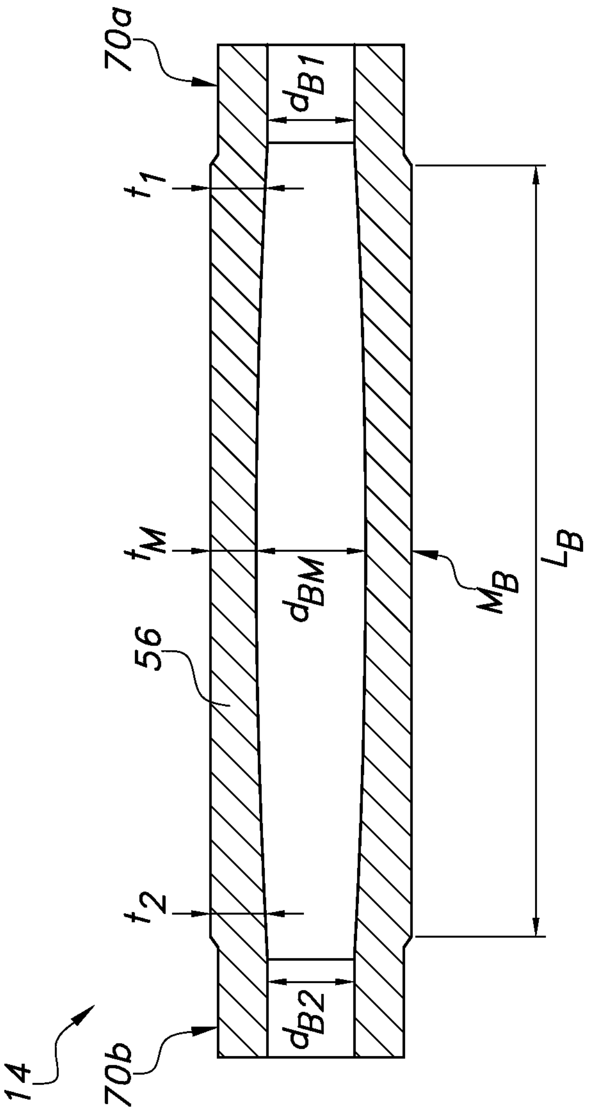
FIG. 7 illustrates a cross-sectional view of the bladder of FIGS. 5 and 6 taken along the line 7-7.
Figure 8:
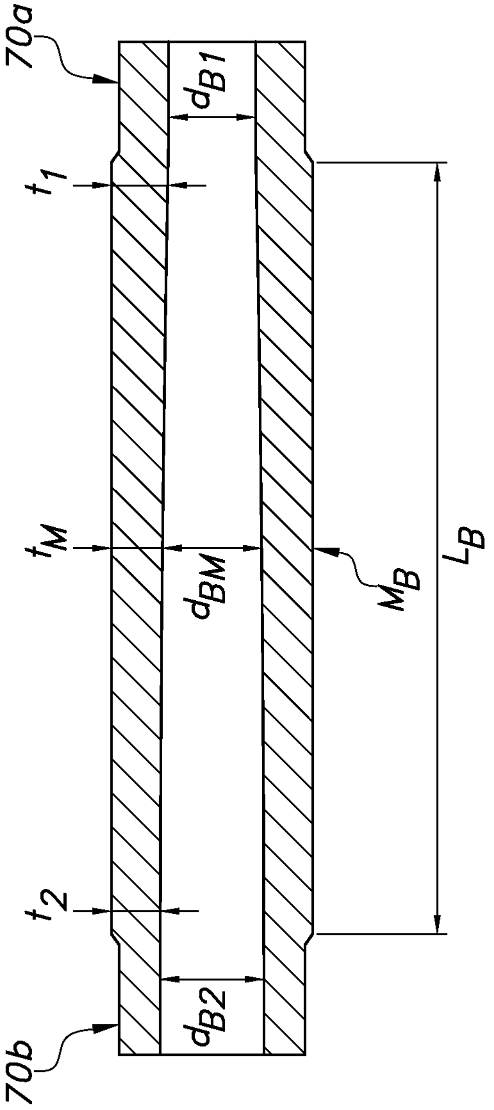
FIG. 8 illustrates a cross-sectional view of a bladder of the non-electrically powered enteral feeding pump of FIG. 2 where the bladder has a wall with tapering thickness.

FIGS. 7 and 8 provide cross-section views of the bladder 14 of FIGS. 5-6 according to two exemplary embodiments of the present subject matter. Turning first to FIG. 7, the bladder 14 has a first inner diameter $d_{B1}$ at the bladder first end 70*a* that is smaller or less than a midpoint inner diameter $d_{BM}$. The midpoint inner diameter $d_{BM}$ is greater or larger than a second inner diameter $d_{B2}$ at the second end 70*b*. As such, the midpoint inner diameter $d_{BM}$ is different than the inner diameter at each of the first and second ends 70*a*, 70*b*, although the first inner diameter $d_{B1}$ may be substantially equal to the second inner diameter $d_{B2}$. Further, the wall thickness t of the bladder 14 varies along the length $L_B$. More specifically, the bladder wall thickness t is generally tapered from the midpoint $M_B$ to each of the first end 70*a* and second end 70*b*, i.e., the bladder 14 has a midpoint wall thickness $t_M$ at the midpoint $M_B$, a first wall thickness $t_1$ at the first end 70*a*, and a second wall thickness $t_2$ at the second end 70*b*. The inner diameter $d_B$ gradually decreases or tapers from the midpoint $M_B$ to the ends 70*a*, 70*b*, such that the inner diameter $d_B$ is slightly smaller at each point along the bladder body length $L_B$ from the midpoint $M_B$ to the first end 70*a* and from the midpoint $M_B$ to the second end 70*b*. Stated differently, the wall thickness t is tapered toward the midpoint $M_B$, i.e., the wall thickness t decreases from each end 70*a*, 70*b* toward the midpoint $M_B$. As such, the wall thickness t is greatest, i.e., the bladder 14 is thickest at each end 70*a*, 70*b*. Tapering the bladder wall thickness tin the midsection as shown in FIG. 7 may have several benefits, as described in greater detail below.

A decreased bladder wall thickness tin the bladder midsection helps to promote uniform filling of the reservoir formed by the bladder 14 when the fill port 64 is aligned with the thinner bladder midsection, e.g., by creating a path of least resistance at the midsection, where there is less material force to overcome to initiate filling because of the decreased wall thickness t. Uniform filling may aid in providing a more consistent pressure and flow rate as the reservoir empties during the infusion.

As previously described, the thinnest bladder wall section provides a path of least resistance because, compared to sections where the bladder is thicker, there is less material force to overcome to initiate filling. As such, the crack pressure of the pump 10 may be lowered. Further, uniform filling also may help provide a more consistent pressure and flow rate as the reservoir empties during an infusion procedure.

As illustrated in FIG. 8, in other embodiments, the bladder wall thickness t may be tapered from one end of the bladder 14 to the other. More particularly, the bladder 14 has a first inner diameter $d_{B1}$ at the first end 70*a* that is greater or larger than a midpoint inner diameter $d_{BM}$. The midpoint inner diameter $d_{BM}$ is greater or larger than a second inner diameter $d_{B2}$ at the second end 70*b*. As such, the midpoint inner diameter $d_{BM}$ is different than the inner diameter at each of the first and second ends 70*a*, 70*b*, and the bladder inner diameter is generally tapered from the first end 70*a* to the second end 70*b*. In the exemplary embodiment depicted in FIG. 8, the inner diameter $d_B$ gradually decreases or tapers from the first end 70*a* to the second end 70*b*, such that the inner diameter $d_B$ is slightly smaller at each point along the bladder body length $L_B$ from the first end 70*a* to the second end 70*b*.

Further, the bladder wall thickness t is different at each point from the first end 70*a* to the second end 70*b*, and more specifically, the wall thickness t increases from the first end 70*a* to the second end 70*b*. As shown in FIG. 8, the wall thickness t gradually and smoothly increases from the first end 70*a* to the second end 70*b*. Described differently, the wall thickness t is tapered from the second end 70*b* to the first end 70*a*, i.e., the wall thickness t gradually decreases from the second end 70*b* of bladder 14 to the first end 70*a* of bladder 14. Accordingly, the bladder 14 is thinnest at the first end 70*a*, where the wall thickness t is the smallest or least, and thickest at the second end 70*b*, where the wall thickness t is the largest or greatest.

By tapering the wall thickness t as shown in FIG. 8 and aligning the fill port 64 with the thinnest part of the bladder 14, the reservoir formed by the bladder 14 may more uniformly fill with fluid and dispense fluid. As previously described, the thinnest bladder wall section provides a path of least resistance because, compared to sections where the bladder is thicker, there is less material force to overcome to initiate filling. As such, the crack pressure of the pump 10 may be lowered. Further, uniform filling also may help provide a more consistent pressure and flow rate as the reservoir empties during an infusion procedure.

In some embodiments, the bladder 14 may be made from a silicone or a polyisoprene material. For instance, an appropriate silicone or polyisoprene material may be one that forms inflatable tubes; results in a maximum pressure, as measured a short distance downtream of the first port, within a desired range when inflated with a predetermined volume of liquid; and provides sufficent constricting forces to expell substantially all the liquid. Of course, other materials also may be suitable for forming bladder 14. Further, an exemplary range of wall thicknesses t for bladder 14 is from about 0.075 inches up to about 0.180 inches. An exemplary range of the inner diameters $d_B$ of bladder 14 is from approximately 0.355 inches to approximately 0.600 inches. Moreover, an exemplary range of durometer hardness of the elastomeric material of the bladder 14 can be from about 25 to about 50, such as from about 28 to about 45, for instance from about 30 to about 40. Various combinations of bladder length $L_B$, wall thickness t, inner diameter $d_B$, and suitable materials (e.g., having varying durometers) may yield bladders having fill volumes in the range of about 50 to about 1000 ml of liquid.

Figure 9D:
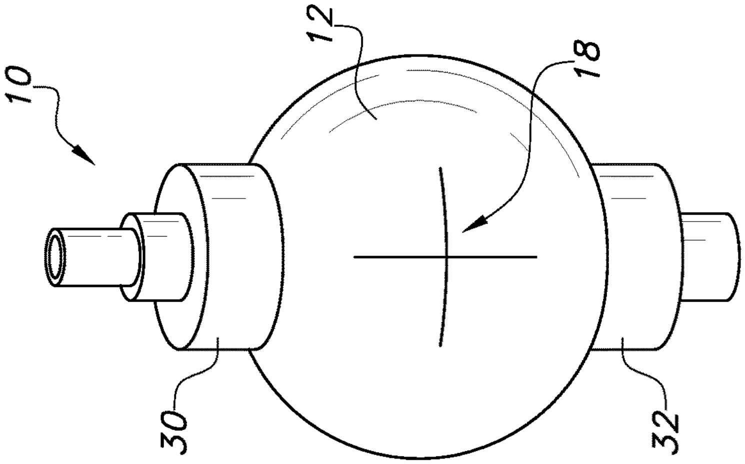
FIGS. 9A-D illustrate a front view of an embodiment of a bladder of the non-electrically powered enteral feeding pump of FIG. 2 having a visual indicator.
Figure 9C:
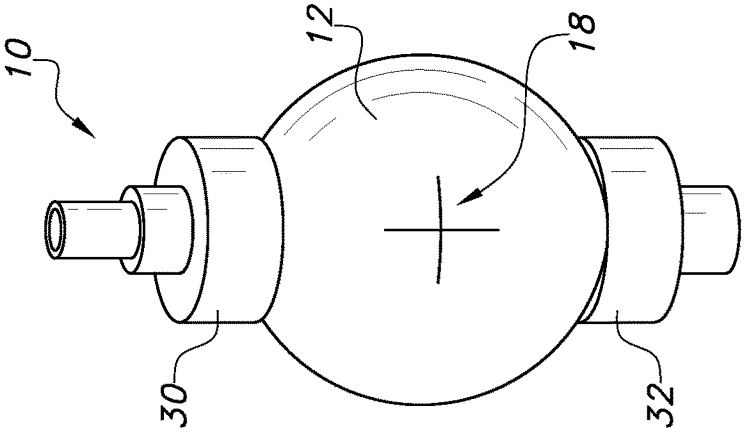
Figure 9B:
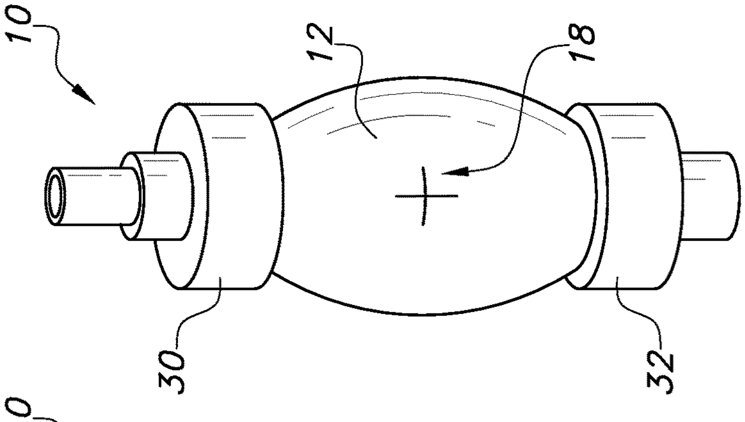
Figure 9A:
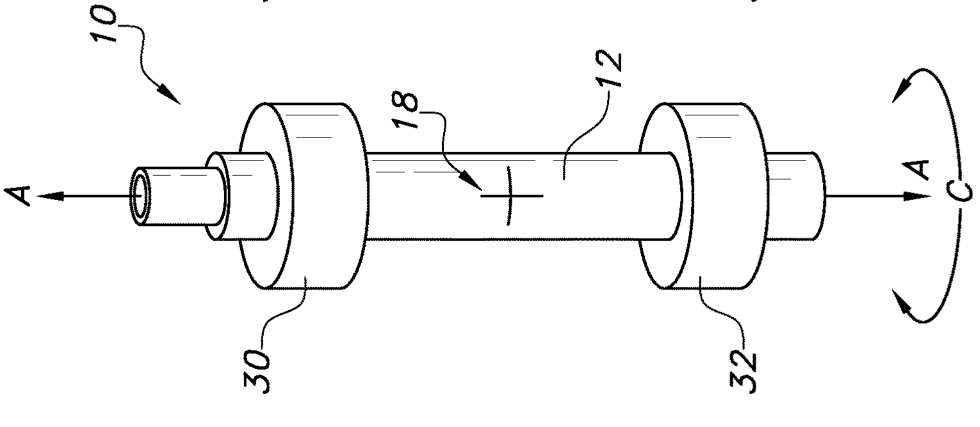
Figure 10:
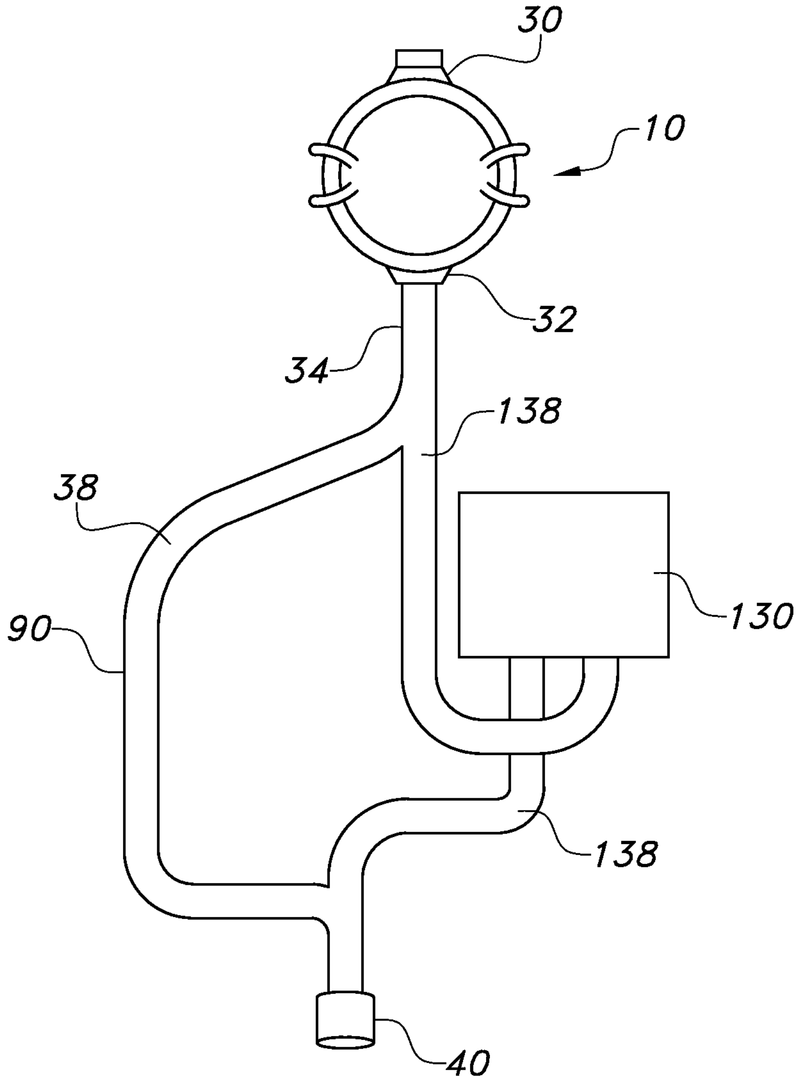
FIG. 10 illustrates an embodiment of a non-electrically powered enteral feeding pump that includes a bolus delivery device.

Referring now to FIGS. 9A through 9D, in the depicted embodiment of elastomeric pump 10, bladder 14 extends from a first end 22 to a second end 24 and defines a circumferential direction C. As fluid is received within a chamber 15 (FIG. 3) defined by bladder 14, bladder 14 expands from a generally deflated position, as shown in FIG. 9A, to a generally inflated position, as shown in FIG. 9D. That is, bladder 14 is expandable and expands from the deflated position to the inflated position as fluid is introduced into chamber 15 through inlet port 62*a* (FIG. 3). Further, bladder 14 contracts from the inflated position to the deflated position as fluid is dispensed from chamber 15 through outlet port 68 and into flow path 38 defined by tube 34 (FIG. 3). More particularly, bladder 14 in the deflated position has a generally cylindrical shape, a first circumference, and a first volume V1. In the inflated position, bladder 14 has a generally spherical shape, a second circumference, and a second volume V2. Second volume V2 is greater or larger than first volume V1. Of course, bladder 14 may have other shapes as well, but regardless of its shape, bladder 14 has a greater or larger volume in its inflated position than in its deflated position.

As depicted in FIGS. 9A through 9D, an indicator 18 may be provided on the outer layer 12 for indicating a change in volume of the bladder 14. For example, the indicator 18 may be a symbol, graphic, text, or other visual or optical feature that is printed, painted, applied, or otherwise provided on the outer layer 12. In the illustrated embodiment of FIGS. 9A through 9D, the indicator 18 can be a symbol, more particularly, a plus sign ("+"), e.g., printed on outer layer 12 or incorporated into the material from which outer layer 12 is made. That is, indicator 18 may be provided on an outer surface of outer layer 12 or embedded within the material forming outer layer 12. In FIG. 9A, chamber 15 is essentially empty, i.e., does not contain an appreciable quantity of fluid such that bladder 14 has its smallest volume and outer layer 12 is in its most contracted or smallest state. In successive FIGS. 9B, 9C, and 9D, chamber 15 is filling with fluid until it is essentially full or has received the quantity or volume of fluid it is to receive for delivery of fluid to patient P as shown in FIG. 9D. That is, for some uses of the enteral pump 10, chamber 15 may not completely fill with fluid such that a quantity or volume of fluid less than a maximum quantity or volume that chamber 15 can accommodate is received in the chamber for dispensing to the patient. However, in other uses of enteral pump 10, chamber 15 may receive the maximum quantity or volume of fluid to dispense to the patient.

As illustrated in FIGS. 9A through 9D, as the chamber 15 fills with fluid, bladder 14 and outer layer 12 each expand, although bladder 14 and outer layer 120 do not necessarily begin to expand at the same moment or expand at the same rate. As the outer layer 12 expands, the indicator 18 provided on outer layer 12 also expands. In the exemplary embodiment shown in FIGS. 9A through 9D, where indicator 18 is a plus sign ("+"), the plus sign expands generally along the axial direction A and the circumferential direction C such that the plus sign changes in size along the axial and circumferential directions A, C with the addition of fluid into chamber 15. Thus, the change in size of the indicator 18 signals to a user of enteral feeding pump assembly 11 a change in volume of the bladder 14, thereby indicating to the user that bladder 14 (more particularly, chamber 15 defined by bladder 14) is filling with fluid for delivering to a patient.

Moreover, the dispensing of fluid from bladder 14, a reverse or opposite process from the filling process illustrated in FIGS. 9A through 9D, also may be visually indicated via indicator 18. As the fluid egresses from chamber 15 and bladder 14 and outer layer 12 contract, the indicator 18 on outer layer 12 contracts or grows smaller. Thus, the change in size of the indicator 18 signals to a user of enteral feeding pump assembly 11 a change in volume of the bladder 14, thereby indicating to the user that bladder 14 (more particularly, chamber 15 defined by bladder 14) is delivering fluid to patient P. Although illustrated in FIGS. 9A through 9D as a plus sign "+", it will be appreciated that indicator 18 may have other forms, shapes, or configurations in other embodiments of outer layer 12 and/or elastomeric pump 10. Also, in other embodiments, indicator 18 may be provided in other locations on outer layer 12. That is, while FIGS. 9A through 9D illustrate indicator 18 as located approximately at an axial midpoint of outer layer 12, in other embodiments indicator 18 may be provided at a higher or lower axial position on outer layer 12. In some embodiments, more than one indicator 18 may be provided on outer layer 12, e.g., such that an indicator 18 may be visible no matter the viewing angle or position of the user.

Returning to FIG. 3, the enteral feeding assembly 11 may further include a tubing set including a tube 34 having a connector 40 at a distal tube end 36, that extends from the second end 24 of the elastomeric pump 10 to provide a means for connecting and dispensing a fluid to a site, such as an enteral feeding tube 50. The tube 34 may include a flow path 38 that forms a continuous flow path through which the fluid may be delivered. The tube 34 can be integrally coupled with the elastomeric pump 10, e.g., by permanently attaching the tube 34 with the elastomeric pump 10 during manufacturing. Alternatively, the tube 34 can be removably coupled with the elastomeric pump 10 as described in further detail below. Optionally, a clamp and/or a filter (not shown) may be positioned in the flow path 38. The clamp can compress the flow path 38 such that fluid flow from the pump 10 is occluded. Such occlusion can be advantageous, e.g., for the transportation and preparation of the assembly 11.

The connector 40 may be a suitable connector for connecting to an enteral feeding device, such as a gastrostomy tube or other enteral feeding port (not shown). In particular, an enteral-only fluid connector may be desirable in order to prevent misconnection with a non-enteral fluid source. For instance, according to example embodiments, the fluid connector 40 of the present invention may include a connector that is compatible with and adapted to the ISO 80369-3 design standard known as ENFIT and is configured for coupling engagement with ENFIT connectors according to the ENFIT design standard, ISO 80369-3, which is incorporated herein by reference. According to some example forms of the invention, the fluid connector 40 can include both enteral-only and ENFIT compatible connectors, for example, for providing compatible coupling engagement with enteral-only connectors and ENFIT compatible connectors. Preferably, the fluid connector 40 described herein can include both enteral-only and ENFIT compatible connectors as desired.

As further shown in FIG. 3, a flow regulator 90 may be positioned in continuous flow path 38. Flow regulator 90 can set the continuous and substantially constant flow rate of fluid from pump 10 to patient P via tubing 34. In some embodiments, the flow rate may be adjusted to a rate within a range, e.g., within a range of about 40 to about 300 ml of fluid per hour. Flow regulator 90 may be manually adjustable, if desired, and provided with a dial, switch, or lever (not shown) with an adjustable flow rate control display (not shown) corresponding to the range of flow rates. It will be appreciated that the foregoing flow rate values are only exemplary, and in other embodiments, the enteral feeding assembly 11 may have other flow rates and the flow rate may be adjustable within another range of flow rates. Alternatively, a constant flow regulator (i.e., a regulator that is not adjustable) can be employed. For example, an optional flow regulating orifice, such as a glass orifice tube (not shown), may be employed in the primary or continuous flow path 38. Moreover, in embodiments having a bolus flow path, an optional second flow regulating orifice may be employed in the bolus flow path.

As further shown in FIG. 3, the enteral feeding assembly 11 can include a flow regulator 90 positioned in a continuous flow path 38. The flow regulator 90 can set the continuous and substantially constant flow rate of fluid from pump 10 to patient P. The flow regulator 90 can optionally be an accessory (not shown) provided in fluid communication with the tubing 34. However, in example embodiments of the present invention, the flow regulator 90 can include the tube 34 itself. In other words, the tube 34 can be provided as a flow control tube. For instance, the tube 34 disposed between the outlet 32 of the bladder 14 and the connector 40 can be configured to control the flow rate of fluid delivered from the bladder 14. The enteral feeding assembly 11 may include one or more interchangeable flow control tubes 34 each configured to deliver fluid at a different flow rate. Specifically, the length L and diameter D (i.e., radius*2) of the tube 34 can be selected to achieve a target flow rate per the Hagen-Pouiselle flow equation:

$$Q = \frac{\Delta p * \pi r^4}{8 \mu L}$$

where Q is the volumetric flow rate, Δp is the pressure drop between the reservoir and the outlet pressure, r is the radius of the lumen of the flow tubing (i.e., an inner radius), μ is the viscosity of the fluid, and L is the length of the flow control tubing. When commercial enteral nutrition formula (ENF) is the fluid being delivered to the patient, the viscosity p of the ENF may be typically provided, e.g., with the packaging of the ENF. The viscosity of commercial ENF can be, for instance, in a range from about 5 to about 100 centipoise (cP). Nevertheless, the pump assembly 11 of the present invention may be used to deliver any fluid, nutritive or otherwise, to a patient P.

The flow control tubes 34 can have an inner diameter in a range from about 0.005 inches (about 0.13 mm) to about 0.03 inches (about 0.76 mm), such as from about 0.01 inches (about 0.25 mm) to about 0.02 inches (about 0.51 mm). The flow control tubes 34 can have a length in a range from about 3 inches (about 7.6 cm) to about 36 inches (about 91 cm), such as from about 5 inches (about 12.7 cm) to about 30 inches (about 76 cm), e.g., from about 6 inches (about 15 cm) to about 28 inches (about 71 cm). As described above, the length L and the inner radius r of the flow can be selected and/or modified to manipulate and control the flow rate of delivery of enteral fluid to the patient P.

For instance, the enteral feeding assembly 11 can include a set of alternative flow control tubes 34 each having different length and/or diameter characteristics in order to achieve various target flow rates. For instance, a set of tubes can include tubes configured to deliver fluid at about 50 ml per hour, about 100 ml per hour, about 200 ml per hour, and about 300 ml per hour, respectively. However, it is to be understood that the present invention contemplates a set of alternative flow control tubes 34 comprising any number, e.g., unlimited quantity, of flow control tubes having varying target flow rates in varying increments.

Additionally or alternatively, the enteral feeding assembly 11 can include an adjustable fluid flow rate tube 34*a*. For instance, the adjustable fluid flow rate tube 34*a* may be formed of an elastomeric or stretchy material. In some aspects of the present invention, the adjustable fluid flow rate tube 34*a* can be formed from silicone. When the elastomeric or stretchy material of the adjustable fluid flow rate tube 34*a* is stretched, the flow characteristics can be altered. For instance, as the adjustable fluid flow rate tube 34*a* is stretched, length L of the tube 34*a* can be increased and/or the diameter (i.e., r*2) of the tube 34*a* can be decreased, thereby altering the flow rate of the fluid delivered through the tube 34*a* according to the Hagen-Pouiselle equation.

Further, the enteral fluid pump assembly 11 can be provided with a drip chamber 82. The drip chamber 82 can be configured to enable a visual indication of flow of liquid from the elastomeric pump 10. For instance, a drip chamber 82 can be coupled to the cap 32 at the second end 24 of the bladder 14 to enable visualization of flow from the bladder 14. Additionally or alternatively, a drip chamber 82 can be coupled to the connector 40 distal from the bladder 14 to enable visualization of fluid flow from the tube 34 toward the patient P. Moreover, a drip chamber 82 may optionally be disposed anywhere along the tube 34. The drip chamber 82 can include at least one transparent window through which fluid flow may be visualized. Additionally or alternatively, all or a portion of the tube 34 can be formed from a transparent or translucent material to enable visualization of the flow of liquid through the tube 34.

In some aspects of the present invention, the enteral fluid pump assembly 11 may be configured to provide for bolus delivery. In such configurations, tube 34 may split into a continuous or primary flow path 38 and a controlled bolus flow path 138. Thus, enteral fluid may be delivered to a patient P from pump 10 via the continuous or primary flow path 38 or from a bolus delivery device 130 via the controlled bolus flow path 138. In the exemplary embodiment illustrated in FIG. 10, the tube 34 splits into two flow paths, the continuous or primary flow path 38 and the bolus flow path 138. A bolus delivery device 130 is in fluid communication with the bolus flow path 138. The bolus delivery device 130 can accumulate a quantity of fluid from the bolus flow path 138 leading from the pump 10 and holds the fluid under pressure until the bolus dose is triggered by a patient operable actuator (not shown) for release into the patient P. Generally, the bolus delivery device 130 is configured to receive fluid, elastically expand to pressurize the fluid, store the pressurized fluid, and dispense the pressurized fluid while avoiding over-administration of a medicinal fluid to the patient. Downstream from the bolus delivery device 130, the continuous flow path 38 and the bolus flow path 138 converge into a single flow path. Optionally, a clamp and/or a filter (not shown) may be positioned in the bolus flow path 138. The clamp can compress the flow path 138 such that fluid flow from the bolus delivery device 130 is occluded. Such occlusion can be advantageous, e.g., for the transportation and preparation of the assembly 11. Further, although described herein as a patient operable bolus delivery device 130, it will be appreciated that any user, such as the patient P, a caregiver, a physician, etc., may operate the actuator to dispense a bolus dose of the medicinal fluid to the patient P.

Figure 11:
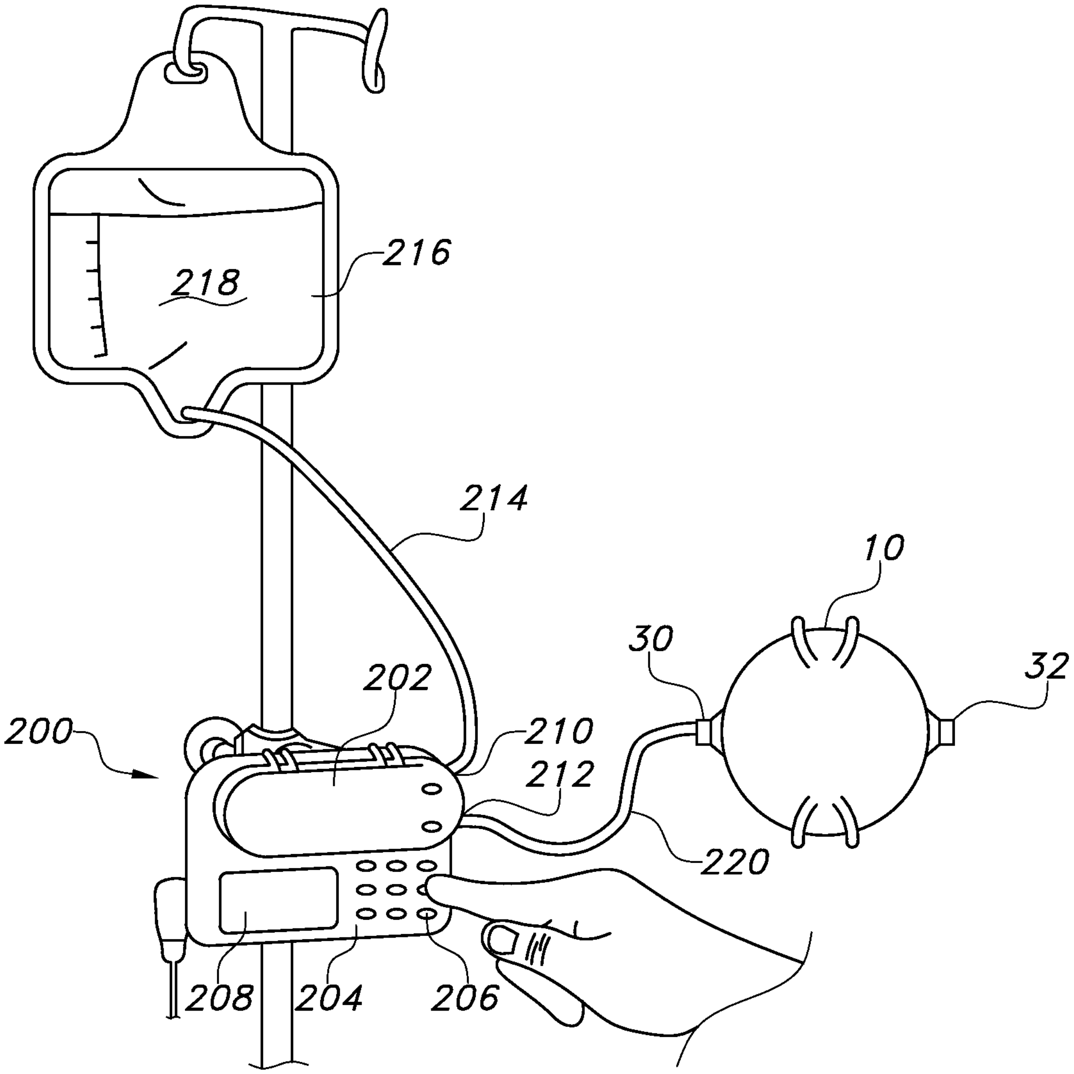
FIG. 11 illustrates an embodiment of a non-electrically powered enteral feeding pump assembly including a peristaltic pump for filling a non-electrically powered enteral feeding pump.

Turning now to FIG. 11, the enteral fluid pump assembly 11 can be coupled to a peristaltic pump assembly 200 to fill the bladder 14. The peristaltic pump assembly 200 can include a peristaltic pump unit 202 and a control unit 204. The control unit 204 may optionally include one or more user inputs 206, such as user input buttons 206 illustrated in FIG. 11, and/or a display 208. The display 208 may optionally be provided as a touch-screen display to both receive user inputs and display information. The peristaltic pump unit 202 may include an inlet 210 for receiving fluid and an outlet 212 for delivering pumped fluid. For instance, as shown in FIG. 11, a fluid reservoir 216, e.g., a bag of fluid, may be operatively connected to the inlet 210 of the pump 202 via a conduit 214. The outlet 212 of the peristaltic pump unit 202 may be operatively connected to the elastomeric pump 10 via a conduit 220. When the peristaltic pump assembly 200 is actuated, the fluid 218 can be mechanically pumped from the reservoir 216 into the bladder 14 of the elastomeric pump 10. By filling the bladder 14 of the elastomeric pump 10 using the assistance of a peristaltic pump assembly 200, as contemplated by the present invention, the crack pressure of the bladder 14 may be achieved more quickly and easily as compared to manually filling the bladder 14 with a manual syringe-type device. Moreover, a peristaltic pump assembly 200 similar to that described herein is typically used for directly providing nutritive fluid to a recipient of enteral nutritive fluid. Thus, the elastomeric pump 10 may be filled quickly and automatically using equipment that a patient typically already has access to.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. An enteral feeding pump assembly comprising:

a non-electrically driven enteral feeding pump comprising an expandable elastomeric bladder defining a chamber, the expandable elastomeric bladder comprising an inlet port and an outlet port;

a first fluid delivery tube, wherein the first fluid delivery tube is configured to be in fluid communication with the chamber via the outlet port, and a set of alternate flow rate fluid delivery tubes, wherein the first fluid delivery tube and at least one alternate flow rate fluid delivery tube of the set are configured to be interchangeably coupled with the expandable elastomeric bladder; and a peristaltic pump, wherein the peristaltic pump is configured to be operatively coupled to the inlet port of the expandable elastomeric bladder for transferring fluid from a reservoir external to the expandable elastomeric bladder into the chamber of the expandable elastomeric bladder.

2. The pump assembly of claim 1, wherein the expandable elastomeric bladder comprises an outer elastomeric bladder and an inner disposable liner.

3. The pump of claim 1, wherein the expandable elastomeric bladder comprises a body formed from a single layer of inert elastomeric material, wherein the chamber is defined by an inner wall of the body of the expandable elastomeric bladder.

4. The pump assembly of claim 1, wherein the first fluid delivery tube comprises a connector adapted to be coupled with an enteral feeding port.

5. The pump assembly of claim 1, wherein the non-electrically driven enteral feeding pump is configured to deliver fluid at a flow rate in a range from about 20 mL/hour to about 300 mL/hour.

6. The pump assembly of claim 1, wherein the first fluid delivery tube is removably coupled with the expandable elastomeric bladder.

7. The pump assembly of claim 1, further comprising a drip chamber, wherein the drip chamber comprises at least one transparent window configured to enable a visual indication of flow through the first fluid delivery tube.

8. The pump assembly of claim 1, wherein the bladder comprises a generally spherical shape.

9. The pump assembly of claim 1, wherein the expandable elastomeric bladder comprises a wall having varying thickness.

10. The pump assembly of claim 1, further comprising a bolus delivery device.

* * * * *